United States Patent [19]

Patrick et al.

[11] 4,396,580

[45] Aug. 2, 1983

[54] FLUID-DYNAMIC MEANS FOR EFFICACEOUS USE OF IONIZING BEAMS IN TREATING PROCESS FLOWS

[75] Inventors: Richard M. Patrick, Winchester; Charles C. Stewart, Concord, both of Mass.

[73] Assignee: Avco Everett Research Laboratory, Inc., Everett, Mass.

[21] Appl. No.: 245,191

[22] Filed: Mar. 18, 1981

[51] Int. Cl.³ ............................................. B01J 19/08
[52] U.S. Cl. ...................................... 422/186; 250/435
[58] Field of Search ......................... 422/186; 250/435

[56] References Cited

U.S. PATENT DOCUMENTS

| | | | |
|---|---|---|---|
| 2,680,814 | 6/1954 | Robinson | 250/49 |
| 2,737,593 | 3/1956 | Robinson | 250/49 |
| 3,105,733 | 10/1963 | Potapenko | 21/74 |
| 3,353,564 | 11/1967 | Bergeijk et al. | 138/41 |
| 3,519,024 | 7/1970 | Johnson et al. | 138/41 |
| 3,572,391 | 3/1971 | Hirsch | 138/40 |
| 3,655,965 | 4/1972 | Icre et al. | 250/435 |
| 3,869,362 | 3/1975 | Machi et al. | 204/157.1 R |
| 3,883,413 | 5/1975 | Douglas-Hamilton | 204/176 |
| 3,901,807 | 8/1975 | Trump | 210/198 |
| 3,964,519 | 6/1976 | De Baun | 138/37 |
| 3,981,815 | 9/1976 | Taniguchi et al. | 252/182 |
| 3,997,415 | 12/1976 | Machi et al. | 204/157.1 H |
| 4,004,995 | 1/1977 | Machi et al. | 204/157.1 H |
| 4,048,504 | 9/1977 | Bosshard | 250/434 |

OTHER PUBLICATIONS

Spatial Distribution of the Fluorescent Radiation Emission Caused by an Electron Beam, A. Cohn and G. Caledonia, Journal of Applied Physics, vol. 41, No. 9, Aug. 1970, pp. 3767–3775.

Primary Examiner—Deborah L. Kyle
Attorney, Agent, or Firm—M. E. Frederick

[57] ABSTRACT

In an apparatus for treatment of a process flow by beams of ionizing radiant energy, drag elements are provided for slowing flow velocity to achieve equal treatment of all portions of the process flow.

9 Claims, 6 Drawing Figures

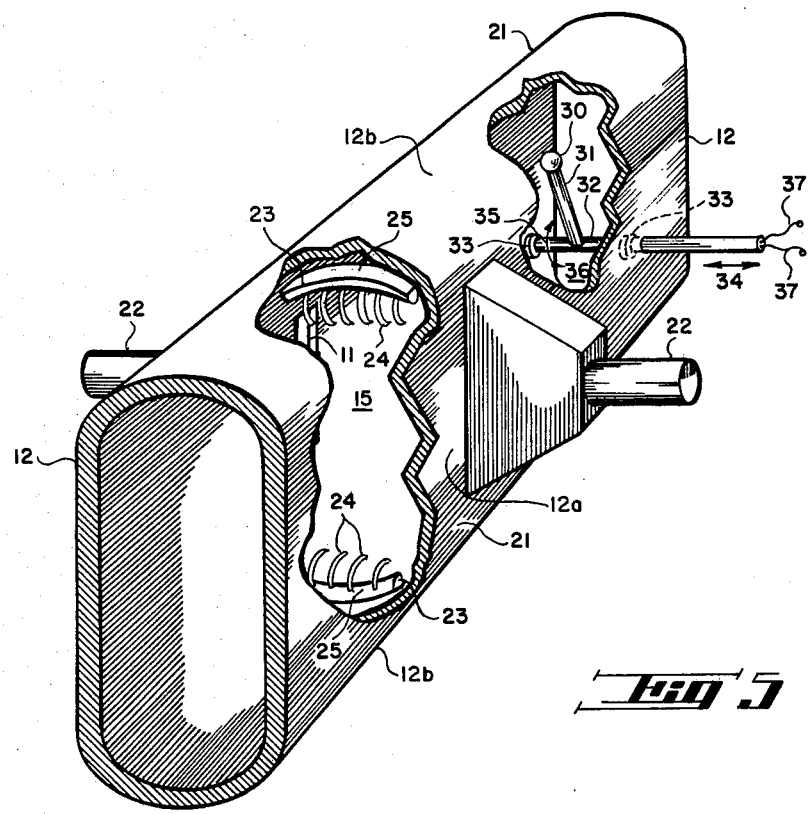
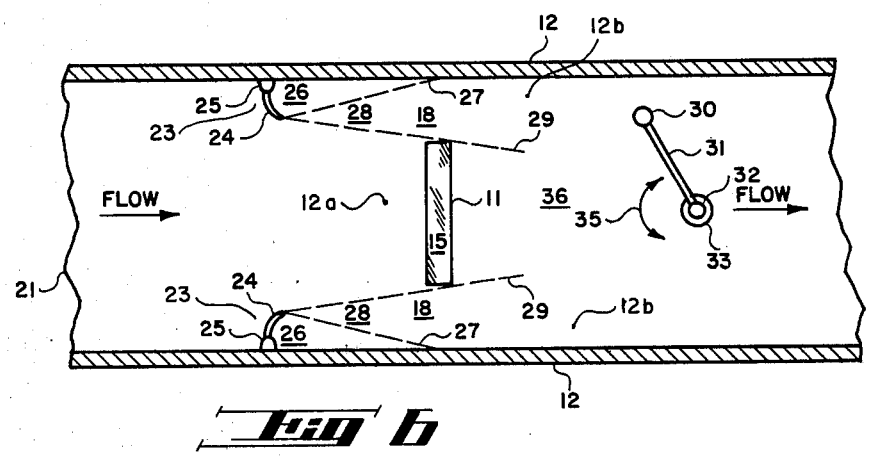

FLUID-DYNAMIC MEANS FOR EFFICACEOUS USE OF IONIZING BEAMS IN TREATING PROCESS FLOWS

BACKGROUND OF THE INVENTION

This invention relates generally to processes and apparatus for treatment of proces flows by beams of ionizing radiant energy, and relates particularly to processes and apparatus using high voltage electron beams.

Typical applications for such processes and apparatus include the sterilization of air described in U.S. Pat. No. 3,105,733; sterilization of water and sewage described in U.S. Pat. No. 3,901,807; and production of ozone and other products described in U.S. Pat. No. 3,883,413. More recently, it has been demonstrated that high voltage electron beams may be used to precipitate difficultly-removable pollutants such as oxides of nitrogen and sulfur from exhaust gases from industrial plants, internal combustion engines, metallurgical operations, electrical generating plants and the like. For a further discussion of this prior art, reference is made to "Radiation Physics and Chemistry," 1977, Vol. 9, pp. 371-388 and U.S. Pat. Nos. 3,869,362; 3,981,815; 3,997,415 and 4,004,995, which are incorporated herein by reference as if set out at length. Nevertheless, as far as is known, this promising process has not yet been put into practice widely on an industrial scale for reasons including, but not limited to, cost problems and the like.

It is clear from the foregoing that beams of ionizing radiant energy, and particularly beams of high voltage electrons, can be efficaceous in treatment of various process flows and can also be cost-effective in many applications. Nevertheless, experience shows that the apparatus and energy required to produce such beams are not so cheap that the beams should be wasted.

SUMMARY OF THE INVENTION

Accordingly, it is the principal object of this invention to provide means for efficaceous use of ionizing radiant beam energy in the treatment of process flows. It is a particular object of this invention to provide means for adequate treatment of a given process flow with a minimum amount of ionizing radiant beam energy. It is a further particular object of this invention to provide means for adequate treatment of a maximum process flow with a given amount of ionizing radiant beam energy. According to this invention, the process flow is exposed to oppositely-directed spread beams of ionizing radiation incident through opposed windows in first opposed walls of a duct carrying the process flow in a direction substantially normal to the beam directions, and drag elements are disposed in the flow, adjacent second opposed walls joining the first opposed walls and upstream of the beams, for example, and/or in the center upstream of the beams where necessary to slow the flow in portions of the process flow exposed to lesser amounts of ionizing radiant energy, so that the time-integrated exposure to ionization is substantially equal for all parts of the process flow.

For convenience in description, the foregoing objects of the invention and the means for attaining them will be described in the context of the employment of high voltage electron beams for the treatment of gaseous process flows; the teaching of the invention is evidently applicable to use with other forms of ionizing radiant energy and with treatment of different process flows. Additional objects of this invention and the means for attaining them will become apparent from consideration of the following description taken in conjunction with the accompanying drawings wherein:

BRIEF DESCRIPTION OF THE DRAWINGS

FIG. 5 is a perspective view, partially broken away, of a duct for carrying a process flow for treatment by electron beams; and FIG. 6 is a longitudinal cross section of the duct of FIG. 5.

DETAILED DESCRIPTION OF THE INVENTION

Figure 1:
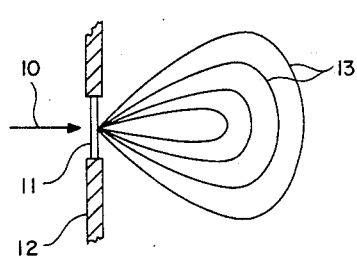
FIG. 1 is a plot of ionization intensity caused by a pencil beam of electrons.

When a pencil beam of ionizing radiant energy is projected into a process flow, the beam, at least in part, loses its compact pencil form and is scattered into a more or less diffuse brush or plume of radiant power exhibiting a considerable range of radiant intensity between its intense inner core and its tenuous outer boundary regions. For a pencil beam of high voltage electrons projected through a thin metallic window into a gas at ordinary pressure, the scattered beam may exhibit a spatial distribution of ionization intensity similar to that depicted in FIG. 1, which is representative of a typical two-dimensional plot of the relative ionization intensity in the gas, in a plane parallel to the axis of the incident pencil beam. In this Figure, the electron pencil beam 10 is incident upon thin window 11 in a wall 12 of a vessel or duct which may enclose a process flow. The beam 10 passes through and is scattered by window 11 and is further scattered by matter in the process flow. Therefore, the ionization intensity evoked by the scattered beam is considerably higher along the axis of the beam than at points away from the axis, as indicated by contours 13 of constant intensity in FIG. 1, inner contours denoting higher ionization intensities than those denoted by outer contours.

If a gaseous process flow were passed through the scattered beam, say in a direction normal to the paper, it is clear that different portions of the flow would encounter different amounts of time-integrated or total exposure to ionization. If one plots the time-integrated exposure to ionization, for a given constant flow velocity, one will find a distribution similar to that depicted in FIG. 2. In this Figure, the contours 14 of constant time-integrated exposure to ionization, in process flow treatment region 15, are somewhat similar to contours 13 of constant ionization intensity of FIG. 1, but show typical fall-off near window 11, due partly to the small size of the scattered beam there and the consequent brief exposure of the process flow.

Figure 2:
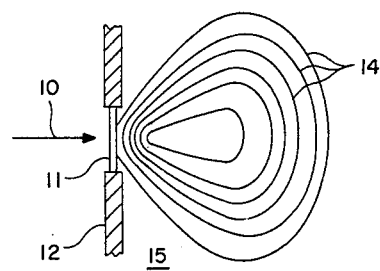
FIG. 2 is a plot of integrated exposure of a flow through such a beam.
Figure 3:
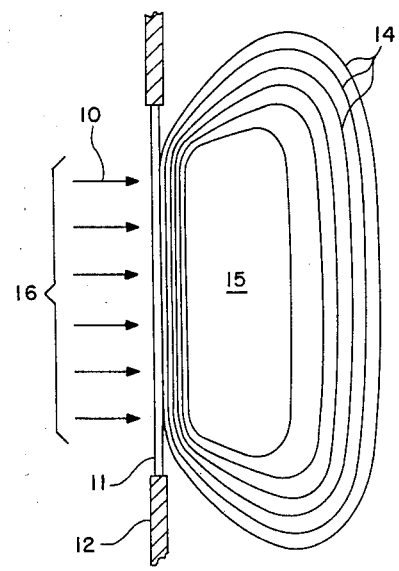
FIG. 3 is a plot of integrated exposure from a spread beam of electrons.

If, instead of employing a simple pencil beam of electrons, one were to project a spread beam, that is a ribbon or fan beam or linearly-scanned beam, into the gas, that is a beam having breadth or subtense normal to the process flow which is greater than its breadth or subtense parallel to the flow, the time-integrated exposure to ionization would be a superposition of plots, similar to that of FIG. 2 for the component incident beams, and could exhibit a spatial distribution similar to that depicted in FIG. 3. In this Figure, an effective plurality of pencil beams 10, achieved by scanning one pencil beam, or a number of pencil beams, or by an electron gun yielding a fan or ribbon beam, provides a spread beam 16 incident upon a correspondingly widened window 11. It is clear that, for the process flow within treatment region 15, the central portions could experience nearly equal amounts of integrated ionization exposure, but that there would be a considerable fall-off in exposure, both in the directions parallel to the mean incident beam direction and in directions normal to both the flow direction and to the mean incident beam direction.

Figure 4:
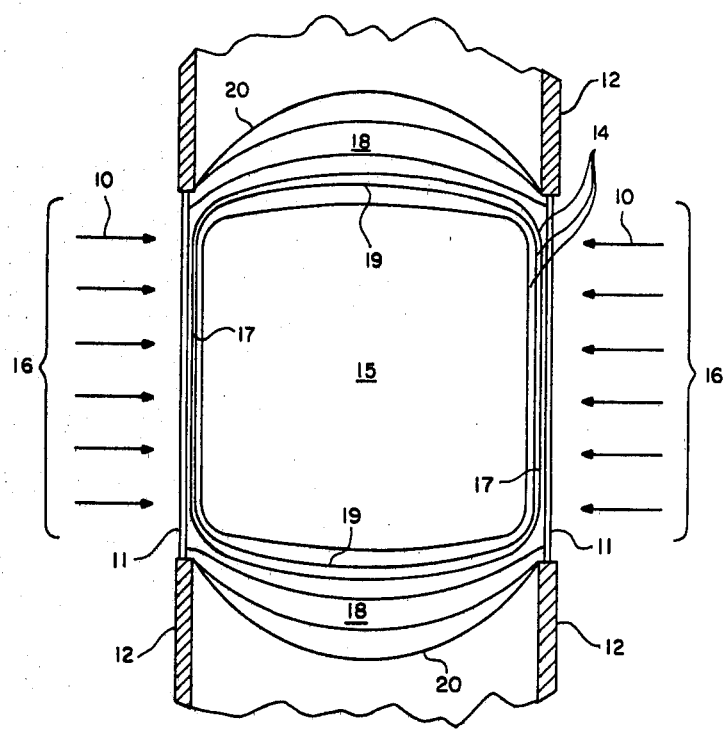
FIG. 4 is a plot of integrated exposure from oppositely-directed spread beams.

In order further to minimize variations in time-integrated exposure to ionization, in directions parallel to the mean incident beam direction, one may project two suitably-separated and oppositely-directed spread beams 16 into the gas, through opposed windows 11 in first opposed walls 12, to achieve a superimposed total time-integrated exposure to ionization similar to that depicted in FIG. 4. Such a distribution exhibits reasonably equal amounts of integrated ionization exposure throughout a large area in treatment region 15 with fall-off, in directions parallel to the mean incident beam directions, only in shallow regions 17 near the thin metallic windows, the thickness of which regions is exaggerated in FIG. 4 in the interest of clarity. However, the fall-off of time-integrated exposure extends over a considerable distance in peripheral regions 18, and the exposure exhibits a gradient there in the direction normal to both the flow direction and the mean incident beam directions. This fall-off of time-integrated exposure is, of course, the result of the exposure of portions of the process flow to differing amounts of the ionizing radiant energy of the electron beams, the amount being greater, for example, for those portions passing between windows 11 than for those portions passing through peripheral regions 18.

For many applications utilizing treatment of process flows by beams of ionizing radiant energy, the desired useful effect can be nearly proportional to the time-integrated exposure to the ionizing radiant intensity, or to a corresponding effect such as the time-integrated ionization exposure. This observation leads to the concept of applying longer exposures where the beam effects are weaker, and vice versa. An application of this concept is set forth in previously-cited U.S. Pat. No. 3,901,807 where the natural boundary-layer slowing of the flow of a liquid, in layers near metallic beam windows, was exploited to roughly match relative ionization density to velocity of the flow in the irradiated region. It should be noted that such an approximate match is Reynolds number dependent, leading to some bounds upon throughput. More importantly, it is limited to matching in only one dimension, in this case parallel to the mean incident beam directions, because of the considerable difference in dimensions of the fall-off regions in the two dimensions normal to the flow direction, peripheral region 18 being, in general, far more extensive than shallow region 17.

If the available ionization distribution is similar to that illustrated in FIG. 4, the natural boundary-layer slowdown in region 17 near windows 11 can be sufficiently well matched to the fall-off in integrated ionization exposure, so that very little beam energy is wasted there. However, in peripheral regions 18 there arises a problem. If the walls 12 were deformed inward to lie along inner constant ionization exposure contours 19 of relatively high integrated exposure, thus defining a duct enclosing that part of treatment region 15 in which the integrated ionization exposure is already relatively equal, it can be seen that boundary layer slowdown along those contours could be reasonably well matched to the fall-off of integrated exposure there. But all of the ionization energy which would otherwise be available in the outer parts of peripheral regions 18 would be absorbed by the walls there and wasted. On the other hand, if walls 12 were to lie along an outer constant ionization exposure contour 20 to relatively less integrated exposure, energy wastage would be avoided but treatment of the process flow in peripheral regions 18 would be insufficient for beam powers adequate for treatment of inner portions of region 15.

Our solution to this dilemma is described with respect to FIGS. 5 and 6 which are, respectively a perspective view, partially broken away, of a duct for carrying a process flow through oppositely-directed electron beams for treatment thereby, and a longitudinal section of that duct.

As shown in FIG. 5, walls 12, defining a duct 21, comprise first opposed walls 12a in which thin windows 11 are located, and further comprise second opposed walls 12b intermediate and joining first opposed walls 12a and shaped to lie approximately along outer contours 20, as described with respect to FIG. 4, of relatively less integrated ionization exposure from spread electron beams, generated by one or more pairs of oppositely-directed electron guns 22, projected into treatment region 15 through thin windows 11. For the purposes of this invention, we prefer to locate second opposed walls 12b approximately along an outer contour 20 where the integrated ionization exposure is a predetermined small fraction of the relatively higher exposure in the central portion of treatment region 15, this fraction being selected to represent an acceptably low loss of total beam energy. Drag elements 23, disposed adjacent walls 12b and upstream of windows 11, introduce a slowdown of process flow velocity in peripheral regions 18, with velocity being lower in regions where ionization intensity is lower, so as to achieve essentially equal integrated ionization exposure for all parts of the flow. Drag elements 23 may conveniently be configured as bars 24 of length, diameter and spacing suitable for exerting the proper drag force upon the flow, and the bars may be mounted on a carrier 25 which is fastened to walls 12b of duct 21.

As shown in FIG. 6, there arise regions 26 of slowed flow in the lee of drag elements 23, as outlined by dashed contours 27 in the Figure. Regions 26 give rise, in turn to regions 28 of velocity-adjusted flow, as outlined by dashed contours 27 and 29, wherein flow velocity decreases from free stream velocity opposite windows 11, to a suitably-decreased velocity near second opposed walls 12b, thus matching process flow velocity to ionization intensity in peripheral region 18, to achieve approximately equal integrated ionization exposure there and generally thoughout treatment region 15.

While drag elements 23 have been illustrated as having the form of bars 24, it is clear that suitable force can be exerted upon the flow by structurally different though functionally equivalent drag elements such as mesh structures, protuberances or vanes in approximately the same locations. Proportioning and locating drag elements to achieve a suitable distribution of flow velocity in regions 15 and 18 is a well understood and reasonably straightforward exercise in drag aerodynamics and turbulent boundary layer and wake development. Methods and data for flow field calculation good enough for engineering design purposes are set forth in well-known works such as "Fluid-Dynamic Drag," S. Hoerner, Hoerner Fluid Dynamics, Brick Town, N.J., 1958 and "Boundary Layer Theory," H. Schlichting, McGraw-Hill, New York, N.Y., 1955.

The form of the spatial distribution of ionization intensity in a gas irradiated by a pencil beam of high voltage electrons is known both from experience with numerous previous devices and from the teaching of reference papers such as "Spatial Distribution of the Fluorescent Radiation Emission Caused by an Electron Beam," by A. Cohn and G. Caledonia published in *Journal of Applied Physics*, 41, pages 3767–3775 (August 1970), and references cited therein. Further, the spatial distribution of ionization intensity is amenable to calculation, such as by Monte Carlo computations of numerous typical scattering histories.

FIGS. 5 and 6 illustrate an embodiment of the invention in which a single pair of opposed spread beams and a single pair of drag elements are employed. It may be advantageous not only to use spread beams stacked one above another in order to irradiate flow through a duct of greater height, but also to array spread beams one after another along the direction of process stream flow in order to achieve greater total integrated ionization exposure using electron guns of a given size. In the latter case, one may array the spread beams at considerable distances from each other, readjusting flow velocity upstream of each one; this could result in a duct of undesirably great length. Alternatively, one may advantageously array the spread beams as close together as possible along the direction of process stream flow with drag element structure positioned wholly upstream of the arrayed beams. In such a case, it appears that a flow velocity distribution, which is closely matched to a typical integrated ionization exposure rate distribution for a beam at the middle of such an array, may provide a sufficiently equal total ionization exposure of the process flow to all the beams of the array.

It is useful to be able to measure the actual distribution of time-integrated exposure to ionization in a process flow exposed to ionizing radiation, both during setup of the flow processing facility and during adjustment of its component settings. While such measurements can be made, or at least inferred, by observing the intended chemical result, we prefer a different method, based upon the fact that most of the radiant energy applied to the flow ends up as heat. For technically useful electron beam dosages of the order of a megarad, typical stack gases exhibit temperature rises of the order of 10° C.; such a temperature rise is readily measurable and provides a reliable indication of the dosage achieved.

In FIGS. 5 and 6, we illustrate a means for measuring such temperature rises. As shown in those Figures, this means may comprise a temperature sensor element 30 carried on a staff 31 which is affixed at right angles to shaft 32. Shaft 32 is carried in bushings 33, set in walls 12 of the duct 21, which allow shaft 32 to be rotated, as indicated by arrow 35, and also to be translated, as indicated by arrow 34. Thereby, temperature sensor element 30 may be positioned at locations completely covering the cross section of duct 21, in a region 36 downstream of treatment region 15. Temperature sensor element 30 may typically comprise a thermistor connected by means of wires 37 to external electrical temperature-indicating means (not shown).

In typical applications in which the process flow may exhibit some spatial inhomogeneity of temperature when entering the treatment region, as well as some temporal fluctuation, it is advantageous to turn the electron beams on and off at a period which is long with respect to the response time of sensor 30 but yet short with respect to temporal fluctuation times of the entering process flow, and to measure the ensuing temperature jumps.

FIG. 4 illustrates a distribution of integrated exposure to ionization due to ionizing radiation from two oppositely-directed beams; the distribution is somewhat lozenge-shaped and exhibits two-fold symmetry. Figures 5 and 6 illustrate means for producting a corresponding distribution of slowing of process flow velocity; this distribution also exhibits two-fold symmetry, with each greater slowing adjacent the second opposed walls. The concept of this invention can be employed for ionization distributions of higher-order symmetry and velocity slowdown distributions of corresponding symmetry, as can be seen from the following example:

If, in addition to the two suitably-separated and oppositely-directed spread beams 16, shown as horizontal in FIG. 4, one were to provide two more oppositely-directed spread beams 16 at right angles to the first two, that is, vertical in the Figure, the resulting distribution of integrated exposure to ionization would be the superposition of four distributions like that of FIG. 3 or of two distributions like that of FIG. 4 at right angles. Such a distribution is somewhat cruciform, with four-fold symmetry, and can provide a large treatment region 15 of reasonably-equal ionization exposure with peripheral regions 18 of relatively less exposure becoming four small regions in the corners between adjacent beams. To treat a flow with ionizing radiant energy yielding such a distribution of integrated exposure to ionization, one may use a duct 21 having a bluntly cruciform cross section with beams 16 entering the four sides and with drag elements disposed upstream of the four peripheral regions 18 in the corners between adjacent beams 16.

Using the nomenclature employed with respect to FIGS. 5 and 6, it can be said that such a four-beam arrangement has four first opposed walls 12a each carrying a window 11, with four second opposed walls 12b intermediate and joining first opposed walls 12a to bound peripheral regions 18 in the four corners between the beams 16. Again, drag elements 23 may be disposed adjacent walls 12b upstream of windows 11 to introduce a suitable distribution of slowdown of process flow velocity, in this case a distribution exhibiting four-fold symmetry. From the foregoing, it can be seen that the concept of this invention can be employed for ionization distributions of other symmetries; for odd-order symmetries, the term "opposed" may be given a suitably broadened interpretation. Further, if the distribution of integrated exposure to ionization were to exhibit a localized minimum near the center line of the duct, as may occur with wider spacing between oppositely-directed beams, one may dispose drag elements such as, for example, a drag element or bar or the like upstream of the beams near the center line to slow the flow appropriately.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. Apparatus for treatment of a process flow by beams of ionizing radiant energy, said apparatus comprising:
   (a) a duct for conducting a process flow from upstream locations through a radiating region to downstream locations, said duct having first opposed walls, and second opposed walls joining said first opposed walls;
   (b) opposed windows, impervious to said process flow but pervious to said ionizing radiant energy, located in said first opposed walls;
   (c) ionizing radiation generating means for projecting beams of ionizing radiant energy through said windows into said duct, said beams exposing portions of process flow in said duct to differing amounts of said ionizing radiant energy defining contours of constant time-integrated exposure to said ionizing radiant energy, portions adjacent said second opposed walls being exposed to lesser amounts than other portions, said second opposed walls each substantially conforming to a contour of constant exposure to said ionizing radiant energy defining an exposure which is a predetermined small fraction of the maximum value of said exposure; and
   (d) drag element means disposed adjacent said second opposed walls at a location upstream of said beams, said drag element means being arranged and adapted to produce turbulence only adjacent each of said second opposed walls effective to slow substantially only said portions of process flow adjacent each of said second opposed walls and exposed to said lesser amounts of radiation sufficiently that all portions of said process flow are substantially equally treated by said ionizing radiant energy.

2. Apparatus according to claim 1 wherein said beams are spread beams having subtense, normal to said process flow, substantially greater than subtense parallel to said process flow.

3. Apparatus according to claim 1 wherein said drag elements comprise bars projecting into said flow adjacent said second opposed walls.

4. Apparatus according to claim 1 wherein said drag elements comprise mesh structures supported in said flow adjacent said second opposed walls.

5. Apparatus according to claim 1 wherein said drag elements comprise protuberances, borne by said second opposed walls, and projecting into said process flow.

6. Apparatus according to claim 1 wherein said ionizing radiant energy comprises high voltage electrons and said windows are pervious to said high voltage electrons.

7. Apparatus according to claim 6 wherein said process flow is substantially gaseous.

8. Apparatus according to claim 7 and further comprising temperature measuring means movably mounted upon a carrier so as to be movable over substantially the entire cross section of said duct at a location downstream of said beams.

9. Apparatus according to claim 8 wherein said carrier comprises a shaft, rotatable and reciprocatable in bushings mounted in opposed walls of said duct, and a staff projecting at right angles from said shaft within said duct.

* * * * *